(12) United States Patent
Kelly et al.

(10) Patent No.: US 9,688,279 B2
(45) Date of Patent: Jun. 27, 2017

(54) VEHICLE TRACTION CONTROL METHOD, SYSTEM, CONTROLLER AND VEHICLE WITH SUCH A SYSTEM

(71) Applicant: Jaguar Land Rover Limited, Whitley Coventry Warwickshire (GB)

(72) Inventors: James Kelly, Solihull (GB); Andrew Fairgrieve, Rugby (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 251 days.

(21) Appl. No.: 14/389,561

(22) PCT Filed: Mar. 29, 2013

(86) PCT No.: PCT/EP2013/056825
§ 371 (c)(1),
(2) Date: Sep. 30, 2014

(87) PCT Pub. No.: WO2013/144346
PCT Pub. Date: Oct. 3, 2013

(65) Prior Publication Data
US 2015/0073674 A1    Mar. 12, 2015

(30) Foreign Application Priority Data

Mar. 30, 2012  (GB) .................................. 1205708.9

(51) Int. Cl.
*B60W 10/06*         (2006.01)
*B60W 10/184*        (2012.01)
(Continued)

(52) U.S. Cl.
CPC ....... *B60W 30/18172* (2013.01); *B60K 28/16* (2013.01); *B60W 10/04* (2013.01);
(Continued)

(58) Field of Classification Search
None
See application file for complete search history.

(56) References Cited

U.S. PATENT DOCUMENTS

| 4,974,694 A | 12/1990 | Matsumoto |
| 4,999,778 A | 3/1991 | Ruhl et al. |
| (Continued) | | |

FOREIGN PATENT DOCUMENTS

| DE | 3741248 C1 | 6/1989 |
| DE | 19540067 A1 | 4/1997 |
| (Continued) | | |

OTHER PUBLICATIONS

Zanten Van a. et al.: "FDR-DIE Fahrdynamik-Regelung Von Bosh", ATZ Automobiltechnische Zeitschrift, Vieweg Publishing, Viesbaden, DE, vol. 96, No. 11, Nov. 1, 1994, pp. 674-678, 683, XP000478694, ISSN: 0001-2785.
(Continued)

*Primary Examiner* — Edwin A Young
(74) *Attorney, Agent, or Firm* — Reising Ethington P.C.

(57) ABSTRACT

A vehicle control strategy provides for automatically controlled movement from rest with deliberate wheel slip to maximize thrust. Different wheel slip conditions are provided for different terrain types. Wheel slip may be progressively reduced as the vehicle reaches a steady state speed. The strategy may also be implemented to maintain vehicle progress on low friction surfaces. The vehicle driver may be commanded to vary a control input, such as accelerator pedal position.

19 Claims, 2 Drawing Sheets

(51) Int. Cl.
*B60W 30/18* (2012.01)
*B60K 28/16* (2006.01)
*B60W 10/04* (2006.01)
*B60W 10/12* (2012.01)
*B60K 26/02* (2006.01)
*B60K 23/04* (2006.01)

(52) U.S. Cl.
CPC .......... *B60W 10/12* (2013.01); *B60W 10/184* (2013.01); *B60W 30/18027* (2013.01); *B60K 26/021* (2013.01); *B60K 2023/043* (2013.01); *B60W 2520/263* (2013.01); *B60W 2520/266* (2013.01); *B60W 2540/10* (2013.01); *B60W 2550/14* (2013.01); *B60W 2550/141* (2013.01); *B60W 2550/142* (2013.01); *B60W 2550/143* (2013.01); *B60W 2550/147* (2013.01); *B60W 2720/263* (2013.01); *B60W 2720/266* (2013.01)

(56) References Cited

U.S. PATENT DOCUMENTS

| | | | |
|---|---|---|---|
| 5,076,232 A | | 12/1991 | Pfalzgraf et al. |
| 5,159,990 A | * | 11/1992 | Abe ................... B60K 28/16 180/197 |
| 5,193,061 A | | 3/1993 | Tsuyama et al. |
| 2004/0032165 A1 | | 2/2004 | Levy et al. |
| 2009/0024294 A1 | * | 1/2009 | Ishida .................. B60T 8/175 701/87 |
| 2009/0037069 A1 | * | 2/2009 | Inoue .................. B60W 10/06 701/94 |
| 2009/0258754 A1 | * | 10/2009 | Uddin .................. B60W 10/02 477/92 |

FOREIGN PATENT DOCUMENTS

| | | |
|---|---|---|
| DE | 19919969 A1 | 11/2000 |
| EP | 0283453 A | 9/1988 |
| EP | 0377099 A1 | 7/1990 |
| EP | 0818341 A2 | 1/1998 |
| EP | 2193968 A2 | 6/2010 |
| GB | 277813 A | 11/1994 |
| GB | 2446419 A | 8/2008 |
| JP | H02305333 A | 12/1990 |

OTHER PUBLICATIONS

UK Combined Search and Examination Report for corresponding application No. GB1205708.9, dated Jul. 23, 2012, 6 pages.
Written Opinion for application No. PCT/EP2013/056825, dated Aug. 23, 2013, 12 pages.
International Search Report for application No. PCT/EP2013/056825, dated Aug. 23, 2013, 8 pages.
Casady, "Tractor Tire and Ballast Management" G1235, Tractor Tire and Ballast Management, Aug. 1997, 8 pages.
European Examination Report for EP application No. 13719413, dated Mar. 22, 2017, 6 pages.

* cited by examiner

VEHICLE TRACTION CONTROL METHOD, SYSTEM, CONTROLLER AND VEHICLE WITH SUCH A SYSTEM

TECHNICAL FIELD

The present invention relates to a system and method of improving traction control of a vehicle, in particular moving a vehicle from rest, and maintaining vehicle progress in off-highway conditions.

BACKGROUND

Moving a vehicle from rest in highway conditions is well understood. Generally speaking the vehicle transmission is provided with a device to manage the transition of a driven element from a stationary condition to a condition of rotation at engine speed; the device is typically a friction clutch. Slippage of the vehicle tyres on the highway surface is considered negligible, and in any event is undesirable since it may cause excess tyre wear and instability of the vehicle; vehicle drivers are taught to avoid spinning the vehicle wheels, and this is not difficult on a highway where friction between the tyres and the surface is relatively consistent. Maintaining progress once the vehicle is in motion is assured because of the high friction co-efficient between tyres and road.

Where friction between the vehicle tyres and the ground surface is reduced or inconsistent, a conventional approach to drive away may result in relative slipping. This is particularly problematic for novice drivers in off-highway conditions. For example on sand, injudicious spinning of the wheels may cause the vehicle to dig a hole and become stuck. The novice off-highway driver may not appreciate, from inside the vehicle, that wheels are spinning, and the fitment of deep tread off-highway tyres may exacerbate this problem due to their tooth-like excavating properties.

Furthermore, when the vehicle is in motion, it may be relatively easy to spin one or more wheels and thereby lose traction, especially if the friction co-efficient between the tyres and ground surface is inconsistent.

It is against this background that the present invention has been conceived. Embodiments of the invention may provide a method and system of moving a vehicle from rest and of maintaining progress, which is adapted to unknown terrain, which will enable effective transition of the vehicle from a stationary to a moving condition, and which will allow progress to be maintained. Other aims and advantages of the invention will become apparent from the following description, claims and drawings.

SUMMARY

Embodiments of the present invention may be understood with reference to the appended claims.

Aspects of the present invention provide a system, a vehicle and a method.

According to one aspect of the invention for which protection is sought there is provided a method of automatically moving a vehicle from rest and/or of maintaining motion of the vehicle, said method comprising the steps of:
  initiating motion control; and
  automatically maintaining slip of one or more vehicle tyres on the ground surface in the range from a first value to a second value greater than the first.

Thus in some embodiments a method and/or system according to an embodiment of the invention are provided for moving a vehicle from rest only. In some embodiments a method and system according to an embodiment of the invention are provided for maintaining motion of a vehicle only. In some embodiments a method and system according to an embodiment of the invention are provided for moving a vehicle from rest and/or maintaining motion of a vehicle. Moving a vehicle from rest may also be described as setting a vehicle in motion and the terms are used interchangeably herein.

The first value may be substantially 5%. The second value may be substantially 20%. Other values are also useful.

In one aspect of the invention for which protection is sought there is provided a method of automatically moving a vehicle from rest and/or of maintaining motion of the vehicle, said method comprising the steps of:
  automatically limiting slip of one or more vehicle tyres on the ground surface in the range from a first value to a second value greater than the first.

The method may comprise limiting slip to a prescribed value in the range from the first value to the second value. The prescribed value may be determined in dependence on one or more parameters.

Alternatively the method may comprise limiting slip so that it has a value that is within the range from the first to the second values.

In one aspect of the invention for which protection is sought there is provided a method of setting a vehicle in motion and/or maintaining motion of said vehicle, said method comprising:
  automatically attempting to maintain slip of one or more vehicle tyres on the ground surface at a value that is in the range from a first value to a second value greater than the first.

The method may comprise initiating motion control before automatically maintaining slip.

Motion control may for example be initiated by a user means of a selector such as a manually operable selector. Alternatively or in addition motion control may be initiated automatically, for example in response to detection of one or more prescribed circumstances. The circumstances may include a failure of another vehicle system to initiate motion on a surface, such as a speed control system. Alternatively or in addition the circumstances may include a failure of another vehicle system to maintain motion over a surface. For example motion control may be initiated if it is detected that a speed control system has failed to initiate motion over a surface. Alternatively or in addition, motion control may be initiated upon detection of failure of a driver successfully to initiate motion on a surface. For example, detection that a driver has depressed an accelerator pedal, but the vehicle has failed to make sufficient progress corresponding to the amount by which the pedal was pressed and duration for which the pedal was pressed. The method may comprise subsequently initiating motion control automatically once the driver releases the accelerator pedal. Thus, when the driver subsequently depresses the accelerator pedal, motion control may be performed. That is, slip may be limited such that it does not exceed the second value even if the driver demands an amount of torque that would, if delivered, cause slip exceeding the second value. Other arrangements are also useful.

The method may comprise attempting to maintain slip substantially at a selected value in the range from the first value to the second value.

Alternatively the method may comprise permitting a variation in the value of slip provided it remains at a value that is within the range from the first value to the second value.

Alternatively the method may comprise permitting a variation in the value of slip provided it does not exceed a selected value that is in the range from the first to the second value. Thus the amount of slip may be permitted to fall substantially to zero even if the first value is greater than zero, provided adequate progress is being made in initiating motion and/or maintaining motion. Other arrangements are also useful.

The first value may be substantially zero.

Alternatively the first value may be greater than zero.

It is to be understood that embodiments of the present invention thus permit controlled relative slipping of one or more vehicle tyres on terrain over which the vehicle is travelling. This feature may allow effective traction to be maintained without loss of control or vehicle instability. Slipping of the tyres on the terrain may be accomplished by automatically controlling a vehicle motor in a suitable manner, typically by generating sufficient torque to ensure that slipping occurs. A braking system such as a foundation braking system (which may be or include a friction braking system) may be employed to prevent excessive wheel slip (flare).

The first value may be substantially 1% and the second value may be substantially 100%.

Alternatively the first value may be substantially 2% and the second value may be substantially 50%.

The first value may be substantially 5% and the second value may be substantially 20%.

The method may include the step of maintaining driving wheels of the same axle at a speed differential of less than 10%.

The method may include the step of maintaining all driving wheels of vehicle at a speed differential of less than 10%.

The method may include the step of limiting forward acceleration of the vehicle to less than a prescribed value. The prescribed value may be 1.5 m/sec$^2$.

The method may include the step of automatically reducing the percentage slip of tyres with respect to the ground surface as vehicle and engine speeds become compatible.

The method may be arranged wherein said percentage slip is reduced progressively.

The method may comprise reducing the percentage slip of tyres with respect to a ground surface as a speed of travel of a vehicle over ground increases. Thus the amount of permitted slip may be reduced progressively as vehicle speed increases.

Said motion control may be ceased when actual vehicle speed is greater than 90% of a theoretical vehicle speed at the instant engine speed.

The method may include the step of determining a maximum permitted slip according to an operating condition of the vehicle.

The method may include the step of selection by the driver of an operating condition of the vehicle.

Alternatively or in addition the method may include the step of automatic selection of an operating condition of the vehicle.

Optionally, the step of automatic selection of an operating condition comprises selecting the operating condition in dependence at least in part on one or more parameters indicative of a type of terrain over which the vehicle is travelling.

Thus one of a plurality of operating conditions may be selected in dependence on a type of terrain over which the vehicle is travelling. Terrain types may include for example sand, grass, gravel, mud, ruts, snow, ice or any other suitable terrain type.

The parameters may for example include surface coefficient of friction between a wheel and the surface, surface roughness, surface inclination and/or any other suitable parameter. Ambient temperature may be taken into consideration in some embodiments. The parameters may include a 'terrain type' parameter being a parameter that is indicative of terrain type. The parameter may be provided by another vehicle system, such as an automatic terrain type determining system. Alternatively the parameter may be provided in dependence on a setting of a user-operable terrain type setting control.

Optionally, the step of automatic selection of an operating condition comprises selecting the operating condition in dependence at least in part on one or more parameters indicative of a condition of a surface over which the vehicle is travelling.

The parameters may for example include a surface wetness state. Surface wetness state may be determined in dependence at least in part on whether a vehicle is wading, and/or a status of a rain or precipitation indicator. If the rain indicator indicates that it is raining, the surface may be assumed to be wet. Surface wetness may be determined at least in part by reference to a status of a windscreen wiper signal indicating whether windscreen wipers of a vehicle are operating. Other arrangements are also useful.

Optionally, the operating condition corresponds to an operating mode in which each of one or more vehicle subsystems is configured in one of a plurality of respective modes of operation.

For example, if the selected operating mode is (say) a 'sand' mode optimised for travel over sand, as opposed to (say) a 'grass' mode optimised for travel over grass, an engine controller may be configured to employ an accelerator pedal map that is prescribed for use when the sand mode is selected, and not an accelerator pedal map that is prescribed for use when the grass mode is selected.

The method may include the step of comparing transmission speed and wheel speed in order to determine slip.

The method may include the step of comparing transmission speed and ground speed in order to determine slip.

The method may include the step of using torque reaction of driven wheels in order to determine slip.

The method may include the step of automatically initiating said motion control upon selection of one or more prescribed vehicle operating modes.

In a further aspect of the invention for which protection is sought there is provided a method of maintaining and/or initiating motion of a vehicle on a low friction surface, the method comprising the steps of detecting loss of traction of the vehicle, implementing a strategy of maintaining slip of one or more vehicle tyres on said surface in the range from a first value to a second value greater than the first, and during implementation of said strategy advising the vehicle driver of required control inputs to the vehicle.

Optionally, loss of traction comprises greater than 2% slip at any tyre/ground interface.

The method may include the step of advising the vehicle driver by dashboard message, voice message and/or warning tone.

One said one or more required control inputs may comprise variation of accelerator pedal position.

Optionally the strategy may be ceased automatically if wheel slip falls below a predetermined minimum.

Optionally the strategy may be adapted to be disabled by the vehicle driver.

Optionally the strategy may be automatically enabled upon selection or detection of an off-road condition.

Optionally the strategy is disabled above a predetermined vehicle speed.

The method may comprise controlling a relative amount of slip of a left roadwheel with respect to a right road wheel in dependence on steering angle.

Advantageously the method may comprise controlling the relative amount of slip of the left and right roadwheels in order to induce yaw in the direction of steering angle.

Typically the motor is an internal combustion engine, but could be an electric motor or another rotating source of motive power.

In an embodiment of the invention said motion control may be automatically ceased when vehicle speed is substantially compatible with motor speed. Such a circumstance would indicate that sufficient traction of the vehicle is available.

In one embodiment of the invention said motion control may be automatically engaged and disengaged dependent upon whether the vehicle is making progress in accordance with the intention of the vehicle driver.

Thus in one embodiment a vehicle system will automatically compare a driver request, for example an advance of accelerator pedal position, with response of the vehicle, for example acceleration thereof, and if the vehicle response is indicative of wheel slip a method according to an embodiment of the present invention may be automatically invoked.

In the case of an automatic system the method may utilize a target speed and adopt or revert to a standby mode when the target speed is reached. Thus, if the system is employed to accelerate the vehicle from rest, or from a speed below the target speed, the system may adopt the standby mode when the target speed is reached. The target speed may be set by a user in some embodiments. In the event of departure from the target speed by a predetermined amount, the method may be automatically re-implemented if an increase in speed is again indicated. Thus, if the vehicle speed were to fall below the target speed by more than a prescribed amount and a user indicated a desire to return to the target speed, the system may accelerate the vehicle back to the target speed. The system may then revert to the standby mode.

In some embodiments, a control button such as a 'resume' button may be provided, actuation of which results in acceleration of the vehicle to the target speed.

The method may alternatively or in addition include an exit strategy whereby automatic implementation will time-out after a predetermined period, which period may in some embodiments be dependent on a condition of vehicle use. A time-out may be indicated where a method according to an embodiment of the present invention is used to initiate movement of a vehicle from rest. Alternatively the method may be deselected if the vehicle driver demands an engine output torque that is greater than that demanded for traction by a method according to an embodiment of the invention.

A method according to an embodiment of the present invention may be implemented in a system that is operable to implement speed control in which the system maintains the vehicle at a target speed. The system may be arranged to manage slip of one or more wheels to maintain the target speed. That is, unlike conventional highway cruise control systems, in the event wheel slip occurs the system does not cancel speed control but manages slip in such a manner as to maintain vehicle progress.

The system may be operable to accelerate the vehicle from rest to a target speed, and/or to control the vehicle to maintain the target speed. The system may maintain slip within the prescribed range (a value in the range from the first value to the second value) throughout.

Known wheel speed comparison techniques may be used to determine slipping of driven wheels with respect to non-slipping wheels. Alternatively the rotational speed of driven wheels may be compared with a vehicle position sensing device in order to relate wheel speed and vehicle movement. Slipping in excess of the permitted value may be controlled in some embodiments of the invention by application of the relevant wheel brake and/or by a reduction in motor torque and/or by a redistribution of motor torque via a device such as a controllable limited slip differential (torque vectoring). Other torque vectoring technologies may be employed in addition or instead in some embodiments. For example, systems employing one or more clutches to control torque distribution between two or more driven wheels.

Camera recognition techniques may be used to determine vehicle movement, by looking at one or more vehicle wheels to detect slipping thereof, or to look at the terrain surface to determine whether the vehicle is moving at a speed compatible with transmission output speed/engine speed.

The permitted slip of tyres may be selected according to the type of terrain. The type of terrain may be selected by the vehicle driver, or automatically sensed by a suitable sensor system of the vehicle. Thus on a relatively hard surface, the permitted slip of any driven wheel may be close to 5% whereas on a soft surface a greater amount of slip may be permitted in order to gain traction.

A method according to one embodiment of the present invention includes automatically reducing the permitted slip as the vehicle and motor speeds approach compatibility, so as to blend gradually from a condition of relatively high slip to one of low or no slip. Thus on a hard surface permitted slip will blend to zero as motor and vehicle speeds become commensurate. On a soft surface, such as sand, it may be desirable to maintain a degree of slip at all times so that relatively high slip will be blended to low slip as the vehicle speed and wheel speed approach compatibility. Comparison may alternatively be made with a rotating transmission element.

In one embodiment of the present invention, forward vehicle acceleration is limited to a predetermined value during movement control, for example 1.25 m/sec$^2$ or less, so as to ensure smooth and progressive movement of the vehicle. The maximum permitted forward acceleration may be dependent upon the terrain type which is selected. In the event that vehicle acceleration approaches the predetermined value, the degree of permitted wheel slip may be reduced. Should vehicle acceleration not reach the permitted value, the degree of permitted wheel slip may be increased up to the maximum allowable for the terrain on which the vehicle is driven.

A method according to an embodiment of the present invention may be used to ensure effective movement of the vehicle from rest, and may be substantially ceased within 1-2 vehicle lengths in some situations. Likewise a method according to an embodiment of the invention may allow progress to be maintained over a soft surface, such as sand.

According to another aspect of the invention for which protection is sought, there is provided a method of setting a vehicle in motion and/or maintaining motion of a vehicle on a low friction surface, the method comprising the steps of detecting loss of traction of the vehicle, implementing a strategy of maintaining slip of one or more vehicle tyres on said surface in the range from a first value to a second value, and during implementation of said strategy advising the vehicle driver of required control inputs to the vehicle.

Thus in some embodiments a method according to an embodiment of the invention is provided for setting a vehicle in motion. In some embodiments a method according to an embodiment of the invention is provided for maintaining motion of a vehicle. In some embodiments a method according to an embodiment of the invention is provided for setting a vehicle in motion and maintaining motion of a vehicle.

A corresponding system may be provided for only initiating motion, only maintaining motion, or for both initiating and maintain motion. Other arrangements are also useful.

The method may comprise maintaining slip in the range from 1% to 100%, optionally in the range from 2-50%, further optionally in the range from 5-20%. Other ranges are also useful.

This aspect of the invention is counter-intuitive since a detection of loss of traction would normally require a reduction of wheel slip so as to maintain control of the vehicle. In this aspect of the invention wheel slip is maintained to ensure effective travel of the vehicle over a low friction surface.

By low friction surface' we mean any surface on which significant loss of traction can be experienced, typically an off-road surface of for example snow, mud or sand. Loss of traction may be defined as greater than 2% slip at any tyre/ground interface. Loss of traction may be detected in any suitable manner, for example by comparison of wheel speeds, or by comparison of wheel speeds and vehicle speed with respect to a fixed reference.

The strategy may be implemented manually upon the vehicle driver being given an appropriate indication, or may be implemented automatically by a system of the vehicle. If implemented automatically, a suitable indicator may alert the driver, for example by a dashboard message or warning tone.

One of the required control inputs to the vehicle may comprise accelerator pedal position. Thus the vehicle driver may be commanded to depress the accelerator pedal in order to increase engine torque to maintain slip in the range 5-20%. If excess torque is applied, the driver may be commanded to reduce the accelerator pedal opening, corresponding to the amount by which the accelerator pedal is depressed. Any suitable means of indicating a required control input may be used, including voice commands, haptic feedback, display messages, charts, graphs and the like.

The strategy of this aspect of the invention may be ceased automatically if wheel slip falls below a predetermined minimum, of for example 2%, or may be overridden or disabled manually by the vehicle driver. The strategy may be automatically enabled upon selection or detection of an off-road condition, or any other condition where loss of traction may be encountered—for example wading.

The strategy of this aspect may be disabled above a predetermined vehicle speed, which may be settable by the vehicle driver, or may be set automatically by a vehicle system.

Methods according to embodiments of the present invention are typically embodied in a vehicle control system, for example a clutch control system, adapted to automatically vary the coupling between motor and transmission and/or a torque vectoring system, to achieve the intended result. The clutch may be a lock-up clutch of a torque converter. The control system may further control motor torque by alteration of the engine torque/speed map, and be fully automatic upon selection of a suitable control by the vehicle driver.

In one embodiment, the control system is part of a clutch control ECU having input signals from a network BUS or the like, giving the required information about motor speed, transmission speed, transmission ratio, wheel speed, ground speed and the like. Other information, such as motor torque may be derived in some embodiments from a look-up table of an ECU memory by reference to motor speed.

Once initiated by the vehicle driver, movement of the vehicle may be fully automatic until the desired coupling between motor and transmission is achieved, the vehicle has the desired speed or wheel slip has ceased. In some embodiments, the vehicle speed may be maintained until or unless the vehicle driver takes manual control, for example by advancing an accelerator pedal, or another system takes over; the latter may be for example a cruise control module whereby the vehicle driver may speed up or slow down the vehicle by the use of an appropriate control, such as known '+' and '−' buttons.

The method may be implemented whereby the first value is substantially 1% and the second value is substantially 100%.

Alternatively, the first value may be substantially 2% and the second value may be substantially 50%.

Further alternatively, the first value may be substantially 5% and the second value may be substantially 20%.

In a further aspect of the invention for which protection is sought there is provided a system for setting a vehicle in motion and/or maintaining motion of said vehicle, said system being operable to attempt to maintain slip of one or more vehicle tyres on the ground surface at a value that is in the range from a first value to a second value greater than the first.

Alternatively, as described above, the control system may form part of or comprise a speed control system such as an off-road cruise control system, an on-road cruise control system or any other suitable speed control system.

The system may include a torque controller for selectively distributing engine output between driven wheels of the vehicle.

Said controller may be adapted to control the rotational speed of the driven wheels by application of respective wheel brakes.

The system may be operable to determine a torque distribution between a plurality of vehicle wheels.

The system may be operable to implement torque vectoring by distributing torque between a plurality of vehicle wheels.

The system may further include a sensor of ground speed relative to vehicle speed.

The system may be adapted to determine the maximum permitted slip according to an operating condition of the vehicle.

The system may include a command device for instructing a vehicle driver to vary a control input.

Optionally said command is delivered via a vehicle HMI (human machine interface).

In one aspect of the invention for which protection is sought there is provided a controller for setting a vehicle in motion and/or maintaining progress of said vehicle, said controller being adapted to automatically maintain slip of one or more vehicle wheels in the range from a first value to a second value greater than the first.

According to a further aspect of the invention for which protection is sought there is provided a vehicle incorporating a control system or a controller according to a preceding aspect.

The vehicle may have a plurality of selectable operating conditions, and a system according to a preceding aspect.

In an embodiment, a vehicle is configured wherein when a driver switches on the engine and selects a driving mode of operation of a transmission, e.g. 'D' (drive), a vehicle control system monitors wheel spin. In an automatic mode of operation of a vehicle control system for assisting initiation of motion, if excessive wheel spin is detected and a driver subsequently releases the accelerator pedal, the system initiates motion control. Then, when the driver subsequently depresses the accelerator pedal the control system automatically limits slip to a prescribed value between first and second values, the value being selected in dependence on one or more factors. The one or more factors may include the value of one or more parameters such as a surface coefficient of friction between wheels of the vehicle and ground, surface roughness, a type of terrain over which the vehicle is driving, a selected driving mode of the vehicle such as a selected terrain response mode and/or any other suitable parameter. Slip may be limited in one or more of a number of different ways, for example by reducing an amount of torque delivered by a powertrain to a wheel, and/or by applying brake torque to a wheel.

In an embodiment, a vehicle control system is operable in an automatic mode of operation in which when a driver depresses an accelerator pedal control the control system automatically limits slip to a prescribed value between first and second values. Slip is limited to a value selected in dependence on one or more factors as described above.

According to one aspect of the invention for which protection is sought there is provided a method of automatically moving a vehicle from rest, said method comprising the steps of:

automatically maintaining slip of one or more vehicle tyres on the ground surface in the range from a first value to a second value greater than the first.

Optionally the method further comprises initiating motion control before automatically maintaining slip.

The method may comprise attempting to maintain slip substantially at a selected value in the range from the first value to the second value.

Alternatively the method may comprise permitting a variation in the value of slip provided it remains at a value that is within the range from the first value to the second value.

Alternatively the method may comprise permitting a variation in the value of slip provided it does not exceed a selected value that is in the range from the first to the second value. Optionally the amount of slip may be permitted to fall substantially to zero even if the first value is greater than zero, provided adequate progress is being made in initiating motion and/or maintaining motion. Other arrangements are also useful.

According to one aspect of the invention for which protection is sought there is provided a method of maintaining motion of a vehicle, said method comprising the steps of:

automatically maintaining slip of one or more vehicle tyres on the ground surface in the range from a first value to a second value greater than the first.

Optionally the method further comprises initiating motion control before automatically maintaining slip.

The method may comprise attempting to maintain slip substantially at a selected value in the range from the first value to the second value.

Alternatively the method may comprise permitting a variation in the value of slip provided it remains at a value that is within the range from the first value to the second value.

Alternatively the method may comprise permitting a variation in the value of slip provided it does not exceed a selected value that is in the range from the first to the second value. Optionally the amount of slip may be permitted to fall substantially to zero even if the first value is greater than zero, provided adequate progress is being made in initiating motion and/or maintaining motion. Other arrangements are also useful.

Within the scope of this application it is envisaged that the various aspects, embodiments, examples and alternatives, and in particular the individual features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF DRAWINGS

Embodiments of the present invention will now be described, by way of example only with reference to the accompanying drawings in which:—

DETAILED DESCRIPTION

Figure 1:
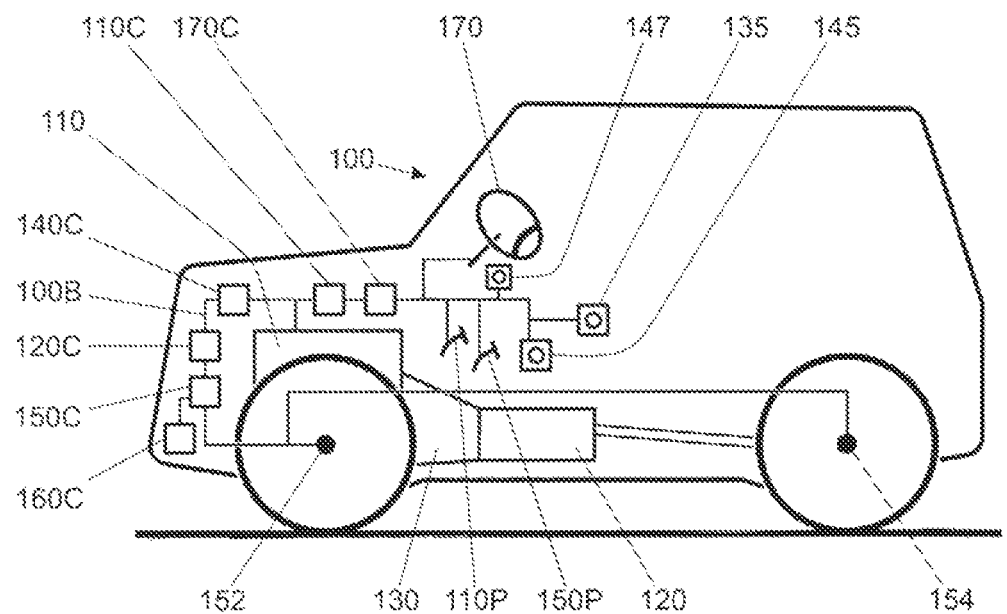
FIG. 1 illustrates a road vehicle according to an embodiment of the present invention.

FIG. 1 is a schematic illustration of a vehicle 100 according to an embodiment of the present invention. The vehicle 100 has a motor in the form of an internal combustion engine 110, a transmission 120 and a coupling 130 for permitting the transmission to progressively reach a speed compatible with motor speed. In the embodiment of FIG. 1 the coupling is a torque converter although other couplings are also useful, such as a friction clutch or other like couplings to a torque converter or a friction clutch. The vehicle 100 has a vehicle control unit (VCU) 140C, an engine controller 110C, a transmission controller 120C, a brake controller 150C, a steering controller 170C and a suspension controller 160C. The vehicle 100 also has a brake pedal 150P and an accelerator pedal 110P. A transmission selector dial 135 allows a user to select a park mode, reverse mode, neutral mode or forward drive operating condition of the transmission. Other selectable conditions are also useful in some embodiments.

The VCU 140C is in communication with the engine controller 110C, transmission controller 120C, steering controller 170C, brakes controller 150C and suspension controller 160C by means of a controller area network (CAN) bus 1008. The controllers 110C, 120C, 170C, 150C, 160C may be referred to as subsystem controllers, and are each operable in a plurality of subsystem function modes. The VCU 140C controls the subsystem controllers 110C, 120C, 170C, 150C, 160C to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The VCU 140C includes a Terrain Response (TR)® System or controller. The system TR functionality may be run in software code on a single computing device comprised by the VCU 140C or on one of a plurality of computing devices comprised by the VCU 140, such as a separate computing device constituting substantially the whole or part of a TR controller.

The vehicle 100 includes a mode selector 145 whereby a driver may select a required driving mode. The VCU 140C sets settings of suspension and drive train (engine controller 110C and transmission controller 120C) appropriate to different terrain conditions according to the selected mode so as to best ensure effective vehicle performance and full utilization of the capabilities thereof. Settings of the engine controller 110C may be modified, for example, in order to modify a response of the engine 110 to a propulsion request, depending on the particular selected mode.

The vehicle 100 is also operable in a state in which it detects automatically the driving mode in which it should operate, and assumes automatically operation in that mode. In some embodiments the vehicle 100 may be provided with a mode sensor for sensing the required operating mode.

In the embodiment of FIG. 1 the VCU 140C monitors vehicle parameters indicative of suspension articulation and wheel slip in order to determine road roughness and surface coefficient of friction. From the measured values the VCU 140C is operable to detect the type of terrain over which the vehicle 100 is driving and determine a required operational mode.

In the embodiment of FIG. 1, the mode selector 145 is operable by the vehicle driver to select an operating mode optimized for travel over sand or gravel or rock.

As noted above, automatic selection of mode may be effected. The VCU 140C refers to the values of parameters generated by suitable vehicle mounted sensors of operating conditions including wheel slip and suspension articulation in order to accomplish this.

Figure 2:
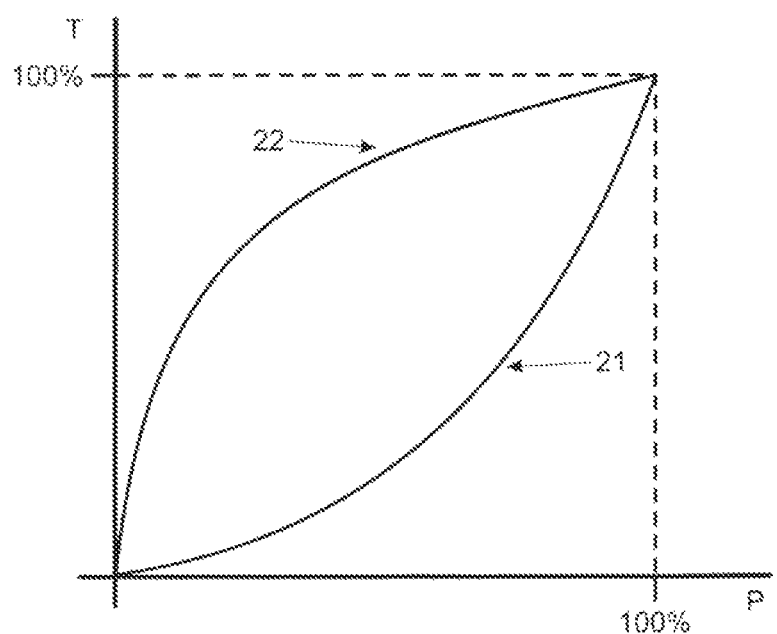
FIG. 2 illustrates two pedal progression maps relating accelerator pedal position to engine torque output.

It is to be understood that movement of a vehicle from rest and/or maintaining motion of a vehicle when off-highway requires care so as to avoid an inappropriate vehicle response. As noted above, the VCU 140C is operable to adjust settings of the engine controller 110C according to the selected operating mode. FIG. 2 illustrates pedal progression maps selectable by the VCU 140C for travel over sand 21 and over rock 22. The pedal progression maps show torque output T of the vehicle motor 110 as a function of accelerator pedal position P; the engine controller 110C is operable to determine the required output torque T as a function of pedal position P from the appropriate map selected by the VCU 140C and to control the engine 110 to develop that amount of torque T.

It can be seen from FIG. 2 that a relatively high torque output is available for a small advance of accelerator pedal 110P from a low % pedal position where rock mode is selected (trace 22), so as to give instant urge to overcome, for example, a rock step. In contrast, in sand mode (trace 21), torque output is less aggressive, so as to avoid wheel spinning. Nevertheless, a control strategy for assisting a novice driver to move a vehicle from a rest condition is desirable, particularly where the terrain type is not correctly determined by the driver.

Some embodiments of the present invention are operable to accomplish movement of the vehicle from rest and/or maintain motion of the vehicle with deliberate wheel slip within a pre-determined range, so as to generate maximum traction at the tyre/terrain interface. Typically in embodiments of the present invention torque sufficient to develop deliberate wheel slip in the pre-determined range is applied to driven wheels of at least one axle of the vehicle, and may be applied to all driven axles. The feature of controlling the torque to develop deliberate wheel slip may be implemented manually by selecting a launch assist/progress assist function via a selector 147. In the present embodiment the VCU 140C is also operable to select automatically the launch assist/progress assist function when it is detected that conditions warrant. For example, if the VCU 140C detects that a driver or vehicle speed control system is seeking unsuccessfully to initiate motion of the vehicle over a surface, or that a vehicle speed control system is unsuccessfully attempting to maintain motion over a surface, the VCU 140C may automatically invoke the function. Other arrangements are also useful.

The predetermined range is a range from a first value to a second value greater than the first. The first value may be substantially zero in some embodiments. In some other embodiments the first value may be non-zero.

The amount of permitted slip is determined empirically according to vehicle type and terrain categorization, and may be as little as 2% or 5% for a hard surface such as rock, and as much as 20% for a soft granular surface such as sand. Thus the first and second values may be 2% and 20% respectively, or 5% and 20% respectively, in some embodiments.

Other values are also useful. For example a value of up to 50% may be useful on some surfaces such as certain types of sand and/or one or more other surfaces. In some embodiments the amount of slip at launch from a substantially stationary condition may be in the range from around 2% to around 100% depending on terrain, optionally in the range from around 2% to around 50%. In some embodiments the amount of slip may be determined in further dependence on a condition of the surface, such as whether the surface is wet or dry.

It is to be understood that by reference to 100% slip is meant that wheel speed is equal to substantially twice the speed of travel of the vehicle. Thus, the wheel revolves twice each time the vehicle travels a distance substantially equal to that which would be traveled by the vehicle in one revolution of the wheel in circumstances where no wheel slip was present.

In the present embodiment the VCU 140C is operable to determine the maximum value of permitted slip for the currently selected driving mode and to command the engine controller 110C to develop sufficient torque to develop slip up to but not exceeding this value. The VCU 140C is configured to increase the amount of commanded torque to a value sufficient to achieve the maximum value of slip and to attempt to maintain slip at the maximum value. The VCU 140C may monitor vehicle acceleration and only attempt to achieve and maintain the maximum allowable value of slip provided vehicle acceleration does not exceed a prescribed maximum value. This value may be set to a value acceptable to vehicle occupants.

In addition, the VCU 140C may limit the maximum amount of torque commanded of the engine controller 110C to an upper torque limit value. The upper torque limit value may be less than a maximum torque value that may be commanded by a driver by means of the accelerator pedal 110P.

A vehicle powertrain (which may have a single engine 121 in some embodiments) is generally able to generate sufficient torque to spin the driving wheels when the vehicle 100 is at rest, and can be commanded to do so by an appropriate control system such as engine controller 110C. Conventional differential gears will generally allow uncontrolled spinning of one driven wheel. Accordingly, some embodiments of the invention require excessive wheel spin to be prevented. Any suitable means of restricting wheel spin may be employed, such as actuation of a wheel brake associated with a spinning wheel, or the use of controllable limited slip differential gears, or a system of torque vectoring whereby the vehicle transmission is adapted to direct torque to individual driven wheels according to demand. An electric machine such as a component of a regenerative braking system and/or powertrain may be employed to apply brake torque in some embodiments.

Conventionally, wheel spinning is considered undesirable, and accordingly is prevented by prior art systems. However in embodiments of the present invention an excess of torque is provided by the vehicle powertrain/engine in order to ensure deliberate controlled slip.

In order to maintain driven wheels in controlled slip, a means of determining slip is required. Suitable devices comprise individual wheel speed indicators, which may be derived from anti-lock braking sensors, in conjunction with an indicator of vehicle speed. The latter may be derived from non-driven wheels, from a GPS system, or in any other convenient manner. Camera systems may be provided to measure individual wheel rotation speed, or to detect movement of the terrain relative to the vehicle. Radar systems or the like whereby an electromagnetic beam is projected and received may also be used to give an indication of vehicle speed over the terrain.

Signals of wheel speed, vehicle speed, engine output torque and the like are generally available on a vehicle network bus such as a CAN (controller area network) bus, and reviewed at a suitable refresh rate, for example exceeding 10 Hz.

Suitable algorithms, developed empirically, or look-up tables assign a required slip according to the selected terrain condition, which may be automatically recognized. The degree of slip assigned may also take into account other factors, such as the transmission ratio selected, and the pitch angle or roll angle of the vehicle at rest. Environmental factors, such as whether it is raining, may also be taken into account. Suitable signals of these factors are generally available on a network bus. For example, a signal may be provided indicating that windscreen wipers of the vehicle are switched 'on', and/or whether a rain detector has detected the presence of rain.

Figure 3:
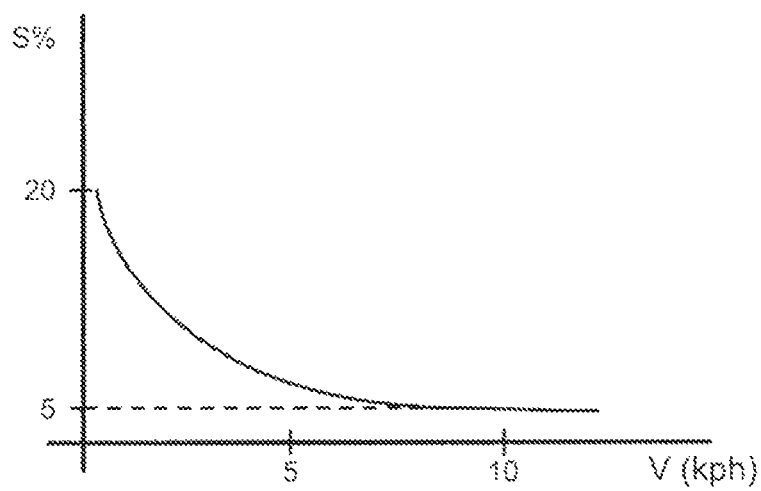
FIG. 3 illustrates variation of slip as a function of vehicle speed in a vehicle according to an embodiment of the present invention in graphical form.

FIG. 3 illustrates a typical characteristic relationship between wheel slip and vehicle speed for movement of a vehicle 100 from rest in sand. The vehicle driver may implement movement by, for example, pressing a button on the vehicle dashboard to give a fully automatic launch. Sufficient engine torque is generated under the command of the VCU 140C, without application of the accelerator pedal 110P to ensure initial wheel slip S % at a value of substantially 20%. As the vehicle gains traction and speed V, the permitted degree of slip is progressively reduced to 5%, which may be desirable in certain sand conditions. At higher speeds or on different terrain relative slip may be reduced to zero. The time to achieve a steady state at 10 kph may be in the range 1-3 seconds in some situations. At this point the vehicle driver may take over by advancing the accelerator pedal 110P or by engaging some other vehicle system such as cruise control. The steady state speed may be varied or selected according to conditions of use.

In one embodiment of the invention, a method according to an embodiment of the present invention once enabled is immediately disabled by any control input from the vehicle driver via the accelerator pedal 110P, brake pedal 150P, transmission mode selector 135 or manual clutch (where provided).

Figure 4:
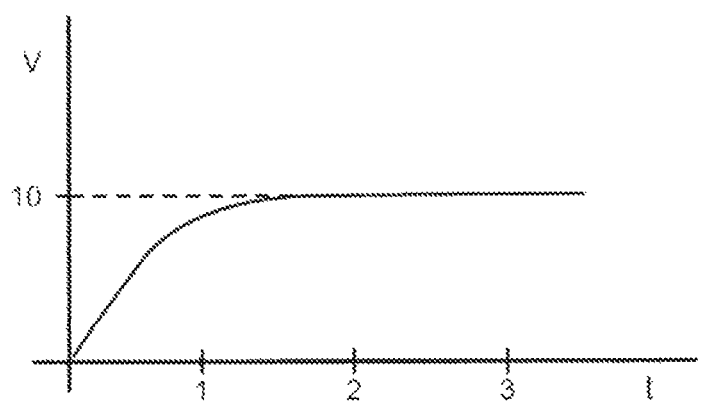
FIG. 4 corresponds to FIG. 3 and shows rising vehicle speed.

FIG. 4 illustrates a typical increase in vehicle speed V over time t as traction is gained, and speed rises to the steady state, for a vehicle according to an embodiment of the present invention. This steady state speed may of course vary according to terrain and other conditions, for example according to pre-set values retained in a look-up table, or according to an algorithm.

Figure 5:
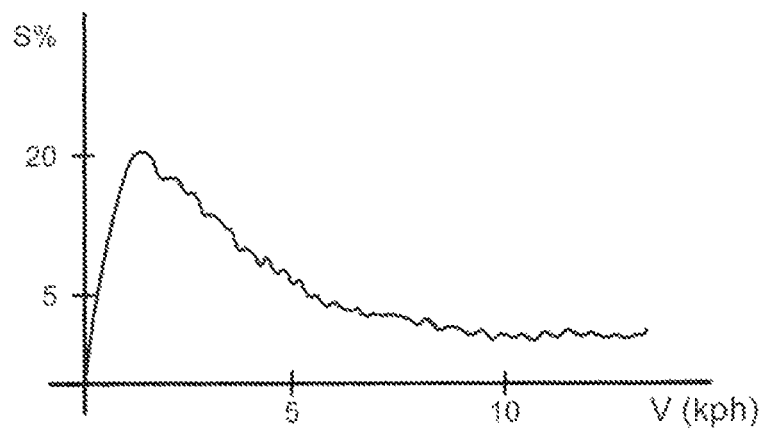
FIG. 5 corresponds to FIG. 3 and shows relative wheel slip.

FIG. 5 illustrates a typical variation of wheel slip S as vehicle speed V increases in a vehicle according to the embodiment of FIG. 1. Initially slip is zero (wheel stationary) but rapidly increases to 20% before dropping to a 5% steady state. Minor variations in the amount of slip S are corrected at the refresh rate of the control system, which may be 10 Hz or greater.

The description of some embodiments of the present invention, as exemplified in FIGS. 1-5, concerns movement of a vehicle from rest. A system and method according to some embodiments of the invention can in addition or instead be used to maintain progress of a vehicle across a low friction surface, or across a surface with an inconsistent friction surface. Thus upon detection of a failure to make progress, as indicated for example by a falling vehicle speed for a steady accelerator pedal position, a method according to an embodiment of the invention may be automatically implemented to control vehicle wheel slip within the range which will best allow the vehicle to increase speed. Such an arrangement may allow automatic engagement and disengagement of vehicle control according to an embodiment of the invention as circumstances dictate, and without action by the vehicle driver. A suitable dashboard or haptic indicator may alert the driver to implementation of traction aid according to an embodiment of the invention, and further a means may be provided for a vehicle driver to inhibit the traction aid if desired.

It is to be understood that embodiments of the present invention may be referred to as traction aids, or methods of aiding traction.

In an alternative or additional method, wheel slip above a predetermined value may be detected as an indication of loss of traction. A strategy of maintaining slip is implemented to ensure effective motion of the vehicle over ground having a low co-efficient of friction. In order to maintain adequate drive train torque sufficient to maintain slipping tyres, the driver is instructed automatically by a vehicle system to make control inputs, principally to vary the accelerator pedal position. By this means an adequate excess as well as a suitable maximum of torque can be assured. Instruction of the vehicle driver may be by any suitable method, including voice command, haptic feedback, display message or display chart/graph. A suitable electronic control unit may issue instructions to the driver in response to measurement, estimation or detection of wheel slip to the intent that the vehicle can automatically maintain the desired degree of slip.

The functions described herein as provided by individual components could, where appropriate, be provided by a combination of components instead. Similarly, functions described as provided by a combination of components could, where appropriate, be provided by a single component.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference. Throughout the description and claims of this specification, the words "comprise" and "contain" and variations of the words, for example "comprising" and "comprises", means "including but not limited to", and is not intended to (and does not) exclude other moieties, additives, components, integers or steps.

The invention claimed is:

1. A method of setting a vehicle in motion, said method comprising:
    maintaining, by a controller, slip of one or more vehicle tires on a ground surface at a value that is in a range from 5-20%, the value being dependent on a type of terrain over which the vehicle is travelling.

2. A method according to claim 1 comprising maintaining slip substantially at a selected value in the range from 5-20%.

3. A method according to claim 1 comprising permitting a variation in the value of slip provided the slip remains at a value that is within the range from 5-20%.

4. A method according to claim 1, and including one or more of the steps of: maintaining driving wheels of a same axle at a speed differential of less than 10%; and maintaining all driving wheels of the vehicle at a speed differential of less than 10%.

5. A method according to claim 1, and including the step of automatically progressively reducing the percentage slip of tires with respect to the ground surface.

6. A method according to claim 1, wherein said method is ceased when actual vehicle speed is greater than 90% of a theoretical vehicle speed at the instant engine speed.

7. A method according to claim 1, and including the step of automatically initiating said method upon selection of one or more prescribed vehicle operating modes.

8. A method according to claim 1 wherein the type of terrain is:
    manually selected by a driver of the vehicle; or
    automatically determined by a sensor system of the vehicle.

9. A method according to claim 1 further comprising determining the value of slip from at least a hardness of the terrain, wherein a larger amount of slip in the range is permitted on a first terrain than on a second terrain, wherein the first terrain is relatively softer than the second terrain.

10. A method of initiating motion of a vehicle on a low friction surface, the method comprising the steps of detecting loss of traction of the vehicle, implementing a strategy of maintaining slip of one or more vehicle tires on said surface in a range from 5-20%, the value being dependent on a type of terrain over which the vehicle is travelling, and during implementation of said strategy advising the vehicle driver of required control inputs to the vehicle.

11. A method according to claim 10, and including the step of advising the vehicle driver by dashboard message, voice message and/or warning tone.

12. A method according to claim 10, wherein the required control inputs to the vehicle comprise variation of accelerator pedal position.

13. A system for setting a vehicle in motion, said system comprising a controller configured to maintain slip of one or more vehicle tires on the ground surface at a value that is in a range from 5-20%, the value being dependent on a type of terrain over which the vehicle is travelling.

14. A system according to claim 13, and including a torque controller for selectively distributing engine output between driven wheels of the vehicle.

15. A system according to claim 14, wherein said torque controller is adapted to control the rotational speed of the driven wheels by application of respective wheel brakes.

16. A system according to claim 13, and including a command device for instructing a vehicle driver to vary a control input.

17. A system according to claim 16, wherein said command is delivered via a Human Machine Interface (HMI) of the vehicle.

18. A vehicle having a plurality of selectable operating conditions, and a system according to claim 13.

19. A controller for setting a vehicle in motion, said controller being adapted to automatically maintain slip of one or more vehicle wheels in a range from 5-20%, the value being dependent on a type of terrain over which the vehicle is travelling.

* * * * *